United States Patent
McCarthy, Jr.

(10) Patent No.: US 12,404,792 B2
(45) Date of Patent: *Sep. 2, 2025

(54) AFTERTREATMENT HEAT UP STRATEGIES

(71) Applicant: Eaton Intelligent Power Limited, Dublin (IE)

(72) Inventor: James E. McCarthy, Jr., Kalamazoo, MI (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 18/717,664

(22) PCT Filed: Dec. 8, 2022

(86) PCT No.: PCT/EP2022/025558
§ 371 (c)(1),
(2) Date: Jun. 7, 2024

(87) PCT Pub. No.: WO2023/104336
PCT Pub. Date: Jun. 15, 2023

(65) Prior Publication Data
US 2025/0043708 A1 Feb. 6, 2025

Related U.S. Application Data

(60) Provisional application No. 63/288,594, filed on Dec. 11, 2021, provisional application No. 63/287,487, filed on Dec. 8, 2021.

(51) Int. Cl.
*F01N 3/20* (2006.01)
*F01N 9/00* (2006.01)

(52) U.S. Cl.
CPC .......... *F01N 3/2013* (2013.01); *F01N 3/208* (2013.01); *F01N 9/00* (2013.01); *F01N 2900/1602* (2013.01)

(58) Field of Classification Search
CPC .......... F01N 3/2013; F01N 3/208; F01N 9/00; F01N 2900/1602
See application file for complete search history.

(56) References Cited

U.S. PATENT DOCUMENTS

| | | |
|---|---|---|
| 5,492,190 A | 2/1996 | Yoshida |
| 5,634,330 A | 6/1997 | Achleitner et al. |

(Continued)

FOREIGN PATENT DOCUMENTS

| | | |
|---|---|---|
| DE | 19548120 C1 | 1/1997 |
| DE | 102017130695 A1 | 6/2019 |

(Continued)

OTHER PUBLICATIONS

Office Action issued in U.S. Appl. No. 18/717,583, mailed Jan. 30, 2025, 11 pages.

(Continued)

*Primary Examiner* — Matthew T Largi
(74) *Attorney, Agent, or Firm* — Talem IP Law, LLP

(57) ABSTRACT

A method of controlling temperature of an engine aftertreatment system includes directing an electric heater in the engine aftertreatment system to apply heat using a first temperature setpoint; while applying the heat at the first temperature setpoint, receiving temperature data from a temperature sensor proximate to a selective catalytic reduction (SCR) device in the engine aftertreatment system; determining from the temperature data that a first temperature is at a first threshold temperature which is less than the first temperature setpoint; and after determining that the first temperature is at the first threshold temperature, directing the electric heater to apply heat using a second temperature setpoint which is less than the first temperature setpoint.

18 Claims, 18 Drawing Sheets

(56) References Cited

U.S. PATENT DOCUMENTS

| | | |
|---|---|---|
| 5,979,158 A | 11/1999 | Kaiser et al. |
| 6,003,304 A | 12/1999 | Swanson et al. |
| 6,151,890 A | 11/2000 | Hoshi |
| 7,367,179 B2 | 5/2008 | Frank et al. |
| 8,327,622 B2 | 12/2012 | Sano et al. |
| 8,413,423 B2 * | 4/2013 | Roos ............... F01N 9/00 180/65.265 |
| 8,756,924 B2 | 6/2014 | Gonze et al. |
| 8,989,935 B2 | 3/2015 | Martin et al. |
| 9,174,625 B2 | 11/2015 | Baum et al. |
| 9,388,722 B2 | 7/2016 | Gonze et al. |
| 10,934,918 B1 | 3/2021 | Goffe et al. |
| 11,148,654 B2 | 10/2021 | McCarthy, Jr. |
| 11,193,438 B1 | 12/2021 | Zhang |
| 11,326,493 B2 | 5/2022 | Swart et al. |
| 11,391,192 B1 | 7/2022 | Harris et al. |
| 11,428,133 B2 | 8/2022 | Light-Holets et al. |
| 11,473,470 B2 | 10/2022 | Webb et al. |
| 11,499,463 B2 | 11/2022 | Swart et al. |
| 11,814,033 B2 | 11/2023 | McCarthy, Jr. et al. |
| 12,071,884 B2 | 8/2024 | McCarthy, Jr. et al. |
| 2006/0278449 A1 * | 12/2006 | Torre-Bueno ............... B60K 6/46 180/65.29 |
| 2008/0282673 A1 | 11/2008 | Gonze et al. |
| 2009/0282812 A1 | 11/2009 | Hu |
| 2011/0258984 A1 | 10/2011 | Santoso et al. |
| 2012/0144826 A1 | 6/2012 | Rebhan et al. |
| 2012/0173062 A1 * | 7/2012 | Madurai Kumar ... B60W 20/13 903/903 |
| 2015/0075143 A1 * | 3/2015 | Gong ............... F01N 3/208 422/111 |
| 2015/0168260 A1 | 6/2015 | Adams et al. |
| 2016/0032803 A1 | 2/2016 | Ettireddy et al. |
| 2018/0094556 A1 | 4/2018 | Kurtz et al. |
| 2018/0334939 A1 * | 11/2018 | Mital ............... F01N 3/106 |
| 2019/0145331 A1 | 5/2019 | Dudar |
| 2019/0186316 A1 * | 6/2019 | Ono ............... B60W 10/06 |
| 2020/0102874 A1 | 4/2020 | Kurtz et al. |
| 2020/0102925 A1 | 4/2020 | Christl |
| 2020/0114897 A1 | 4/2020 | McCarthy, Jr. |
| 2020/0217234 A1 * | 7/2020 | Huang ............... F01N 3/025 |
| 2020/0240306 A1 | 7/2020 | Osemann |
| 2020/0271046 A1 | 8/2020 | Kelly et al. |
| 2021/0339734 A1 | 11/2021 | Boiarciuc |
| 2021/0372312 A1 | 12/2021 | Light-Holets et al. |
| 2022/0025802 A1 | 1/2022 | Webb et al. |
| 2022/0065150 A1 | 3/2022 | Robinson et al. |
| 2022/0136421 A1 * | 5/2022 | Luo ............... F01N 3/2026 60/300 |
| 2022/0145790 A1 | 5/2022 | Leone et al. |
| 2022/0268193 A1 * | 8/2022 | Punde ............... F01N 3/2033 |
| 2022/0333518 A1 | 10/2022 | Nau |
| 2023/0094717 A1 | 3/2023 | Hirooka et al. |

FOREIGN PATENT DOCUMENTS

| | | | |
|---|---|---|---|
| DE | 112018000751 T5 | 11/2019 | |
| WO | WO-2020192973 A1 * | 10/2020 | ........... F01N 3/2006 |
| WO | 2021242228 A1 | 12/2021 | |

OTHER PUBLICATIONS

Office Action issued in U.S. Appl. No. 18/717,622, mailed Feb. 12, 2025, 9 pages.
Office Action issued in U.S. Appl. No. 18/732,195, mailed Jan. 28, 2025, 13 pages.
First Office Action issued in U.S. Appl. No. 18/077,625, mailed May 11, 2023, 15 pages.
First Office Action issued in U.S. Appl. No. 18/077,755, mailed Jul. 11, 2023, 11 pages.
International Search Report and Written Opinion issued in International Application No. PCT/EP2022/025558, mailed Feb. 6, 2023, 9 pages.
International Search Report and Written Opinion issued in International Application No. PCT/EP2022/025559, mailed Feb. 6, 2023, 9 pages.
International Search Report and Written Opinion issued in International Application No. PCT/EP2022/025560, mailed Feb. 6, 2023, 9 pages.
International Search Report and Written Opinion issued in International Application No. PCT/EP2022/025561, mailed Feb. 6, 2023, 11 pages.
International Search Report and Written Opinion issued in International Application No. PCT/EP2022/025563, mailed Feb. 6, 2023, 10 pages.
Second Office Action issued in U.S. Appl. No. 18/077,755, mailed Aug. 23, 2023, 14 pages.
Office Action issued in U.S. Appl. No. 18/732,195, mailed Jan. 28, 2025, 12 pages.

* cited by examiner

Tailpipe CO$_2$ Contribution Differences

| CO$_2$ Contribution and Differences | | | | | | Relative Difference | | | | |
|---|---|---|---|---|---|---|---|---|---|---|
| | Q1 | Q2 | Q3 | Q4 | Total | Q1 | Q2 | Q3 | Q4 | Total |
| Reference – No Burner | 2.29 | 3.37 | 9.38 | 2.20 | 17.24 | - | - | - | - | - |
| Burner; 53 kW; SCR Thr: 200 C | 2.48 | 3.40 | 9.40 | 2.23 | 17.52 | 8.7% | 1.0% | 0.2% | 1.3% | 1.6% |
| Burner; 53 kW; SCR Thr: 220 C | 2.52 | 3.48 | 9.38 | 2.22 | 17.60 | 10.2% | 3.3% | 0.0% | 0.8% | 2.1% |
| Burner; 53 kW; SCR Thr: 240 C | 2.52 | 3.55 | 9.38 | 2.28 | 17.74 | 10.4% | 5.4% | 0.0% | 3.5% | 2.9% |
| Burner; 53 kW; SCR Thr: 190 C | 2.38 | 3.38 | 9.37 | 2.23 | 17.37 | 4.3% | 0.4% | -0.1% | 1.2% | 0.7% |
| Burner; 35 kW; SCR Thr: 200 C | 2.45 | 3.40 | 9.38 | 2.23 | 17.46 | 7.0% | 0.9% | -0.1% | 1.4% | 1.3% |
| Burner; 53 kW; SCR Thr: 400 C-200 C | 2.55 | 3.28 | 9.31 | 2.18 | 17.31 | 11.4% | -2.7% | -0.8% | -1.2% | 0.4% |

FIG. 6C

| DOC Avg Temp, °C | Max Heater Power, KW | Target Temp, °C |
|---|---|---|
| 0 | 6.5 | 240 |
| 160 | 6.5 | 240 |
| 190 | 5 | 220 |
| 200 | 5 | 210 |
| >=210 | 2.4 | 210 |

Upstream Condition → DOC Avg Temp, °C

Maximum Heater Power → Max Heater Power, KW

Control Temperature → Target Temp, °C

FIG. 11

AFTERTREATMENT HEAT UP STRATEGIES

CROSS-REFERENCE TO RELATED APPLICATIONS

This application is the U.S. National Stage Application of International Application No. PCT/EP2022/025558, filed Dec. 8, 2022, which claims the benefit of U.S. Provisional Patent Application Ser. No. 63/287,487, filed Dec. 8, 2021, and U.S. Provisional Patent Application Ser. No. 63/288,594, filed Dec. 11, 2021, which are hereby incorporated by reference in their entirety.

BACKGROUND

In the United States and elsewhere, current engine designs are required to lower emissions and improve fuel economy. The addition of the low load cycle (LLC), in-use emissions compliance, and extended idle operation increase this level of stringency. One of the challenges in lowering emissions is to effectively manage emissions at engine start-up. One approach is to include engine aftertreatment (AT) systems. As is known, nitrogen oxides ($NO_x$) aftertreatment systems are temperature sensitive. High $NO_x$ conversion begins between 200° C. and 280° C., depending on catalyst formulation. Typically, at engine start-up, idle exhaust temperatures can be between 110° C. and 150° C. In this regard, an amount of time is needed for the exhaust to heat up from the typical exhaust temperatures to the elevated temperatures that satisfy the desired 95% (or above) efficiency target. Engine operation during this amount of time is inefficient for $NO_x$ conversion and therefore creates a need to address the potential emissions non-compliance.

BRIEF SUMMARY

Aftertreatment (AT) heat up strategies are described An aftertreatment heat up strategy in accordance with certain embodiments herein can more closely control the pollution collection characteristics of the aftertreatment.

A method of controlling temperature of an engine aftertreatment system includes directing an electric heater in the engine aftertreatment system to apply heat using a first temperature setpoint: while applying the heat at the first temperature setpoint, receiving temperature data from a temperature sensor proximate to a selective catalytic reduction (SCR) device in the engine aftertreatment system; determining from the temperature data that a first temperature is at a first threshold temperature which is less than the first temperature setpoint; and after determining that the first temperature is at the first threshold temperature, directing the electric heater to apply heat using a second temperature setpoint which is less than the first temperature setpoint.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 5A shows plots illustrating effect on exhaust temperature vs. time with application of a two-tier strategy in accordance with the subject disclosure. FIG. 5B shows plots of SCR inlet temperature vs. time comparing different approaches. FIG. 5C shows plots of SCR average temperature over time comparing different approaches.

FIG. 6A-6C show plots from test runs for a HOT Federal Test Procedure (FTP) cycle. FIG. 6A shows a plot of tailpipe (TP) $CO_2$ VS. TP $NO_x$. FIG. 6B shows a plot of tailpipe $NO_x$ mass vs. time. FIG. 6C illustrates a table showing tailpipe $CO_2$ contribution differences.

FIG. 7A shows plots of SCR temperature over time and tailpipe $NO_x$ over time for comparing burner operation to no burner operation. FIG. 7B shows a plot of aftertreatment system temperatures (and flow rate) vs. time.

FIG. 11 illustrates a table of example average aftertreatment system upstream conditions, max heater power, and target temperature.

DETAILED DESCRIPTION

Aftertreatment heat up strategies are described. Selective Catalytic Reduction (SCR) is an active emissions control technology system that reduces tailpipe emissions of nitrogen oxides ($NO_x$). The functionality of the SCR is limited by temperature of the system. As mentioned above, during cold start operations, the exhaust temperatures may be too low. Thus, the SCR must be pre-heated for the desired $NO_x$ reduction to occur. However, the SCR can also become overheated, reducing the SCR's effectiveness. It has been found that heating the SCR at a single temperature setpoint can lead to overheating. The current temperature regulation of the SCR is insufficient to meet upcoming $NO_x$ regulations. There is a need to effectively control the temperature of the SCR to maintain ideal temperature conditions to increase SCR effectiveness.

An aftertreatment heat up strategy in accordance with certain embodiments herein can more closely control the pollution collection characteristics of the aftertreatment. Such a strategy can be characterized as a 2-tier ("two-tier") heating strategy. In particular, the heating strategy involves controlling an e-Heater or other exhaust heating device in two tiers such that there is more than one temperature setpoint for the exhaust heating device.

The described 2-tier heating strategy can be applied to an exhaust heating device such as an electric heater (e-Heater). The e-Heater can be upstream of certain pollution collection substrates, for example, the SCR, which can collect $NO_x$ or $CO_2$ pollutants as a substrate.

FIGS. 1A-1E illustrate examples of compatible aftertreatment heating configurations. Configurations 1-5, which correspond to FIGS. 1A-1E, are working examples with an e-Heater as the exhaust heating device in an exhaust system upstream of an SCR.

Figure 1A:
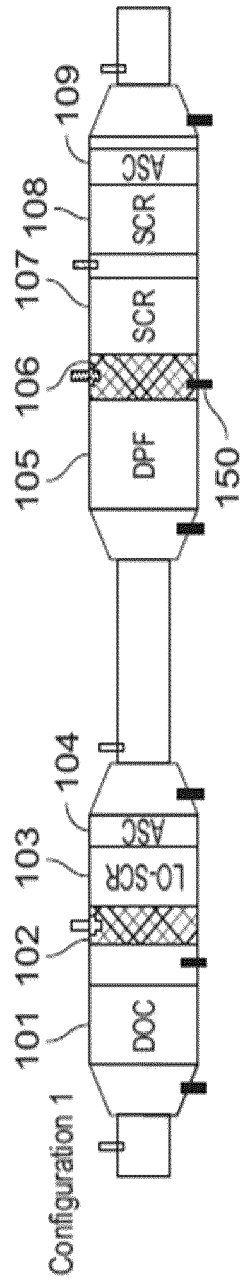
FIGS. 1A-1E illustrate examples of compatible aftertreatment heating configurations.

Referring to FIG. 1A. Configuration 1 includes, for an output of an engine, a diesel oxidation catalyst (DOC) 101, a first e-Heater 102, a light-off selective catalytic reduction (LO-SCR) 103, a first ammonia slip catalyst (ASC) 104, a diesel particulate filter (DPF) 105, a second e-Heater 106, a first SCR 107, a second SCR 108, and a second ASC 109.

Figure 1B:
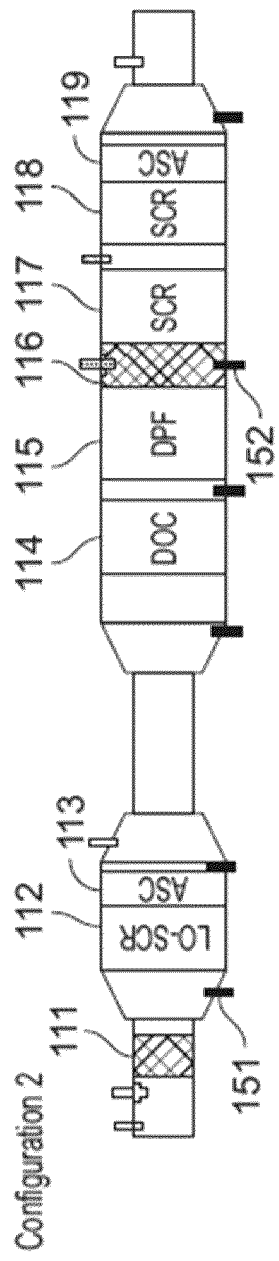

Referring to FIG. 1B, Configuration 2 includes, for an output of an engine, a first e-Heater 111, a LO-SCR 112, a first ASC 113, a DOC 114, a DPF 115, a second e-Heater 116, a first SCR 117, a second SCR 118, and a second ASC 119.

Figure 1C:
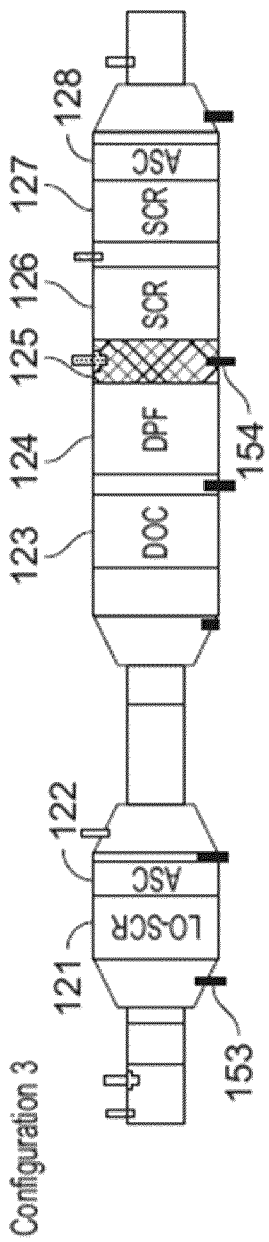

Referring to FIG. 1C, Configuration 3 includes, for an output of an engine, a LO-SCR 121, a first ASC 122, a DOC 123, a DPF 124, an e-Heater 125, a first SCR 126, a second SCR 127, and a second ASC 128.

Figure 1D:
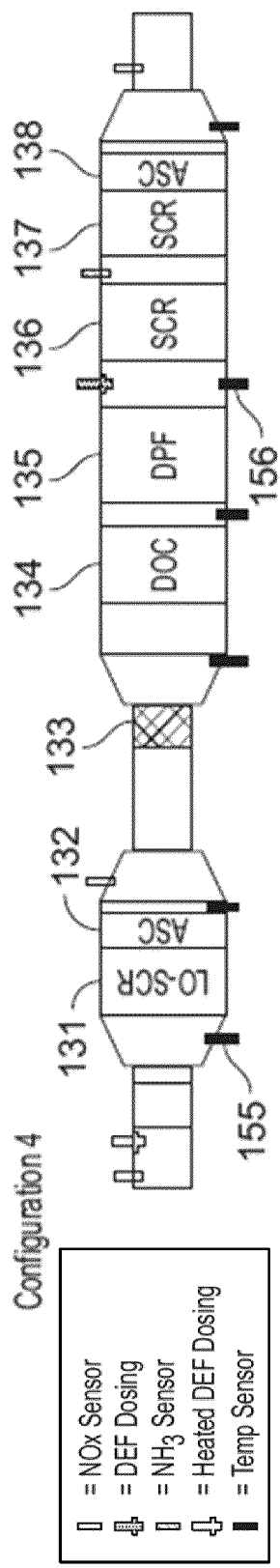

Referring to FIG. 1D, Configuration 4 includes, for an output of an engine, a LO-SCR 131, a first ASC 132, an e-Heater 133, a DOC 134, a DPF 135, a first SCR 136, a second SCR 137, and a second ASC 138.

Figure 1E:
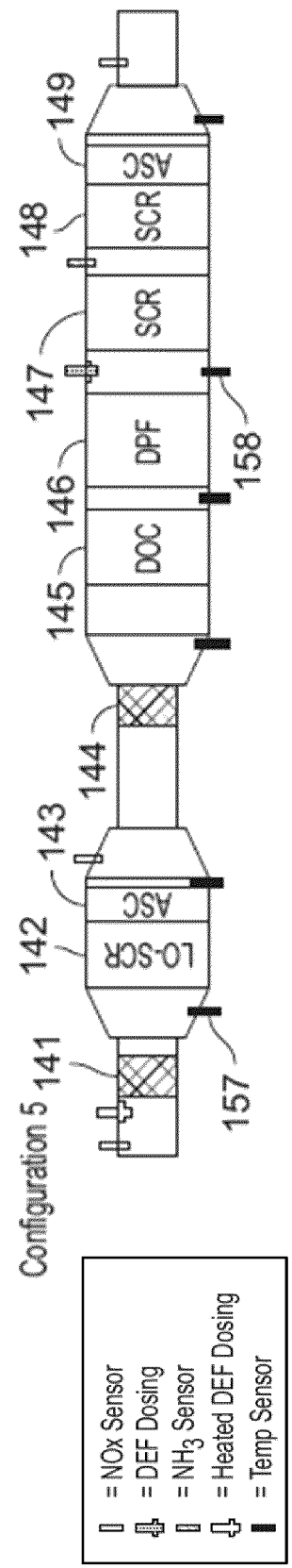

Referring to FIG. 1E, Configuration 5 includes, for an output of an engine, a first e-Heater 141, a LO-SCR 142, a first ASC 143, a second e-Heater 144, a DPF 146, a first SCR 147, a second SCR 148, and a second ASC 139.

Figure 2:
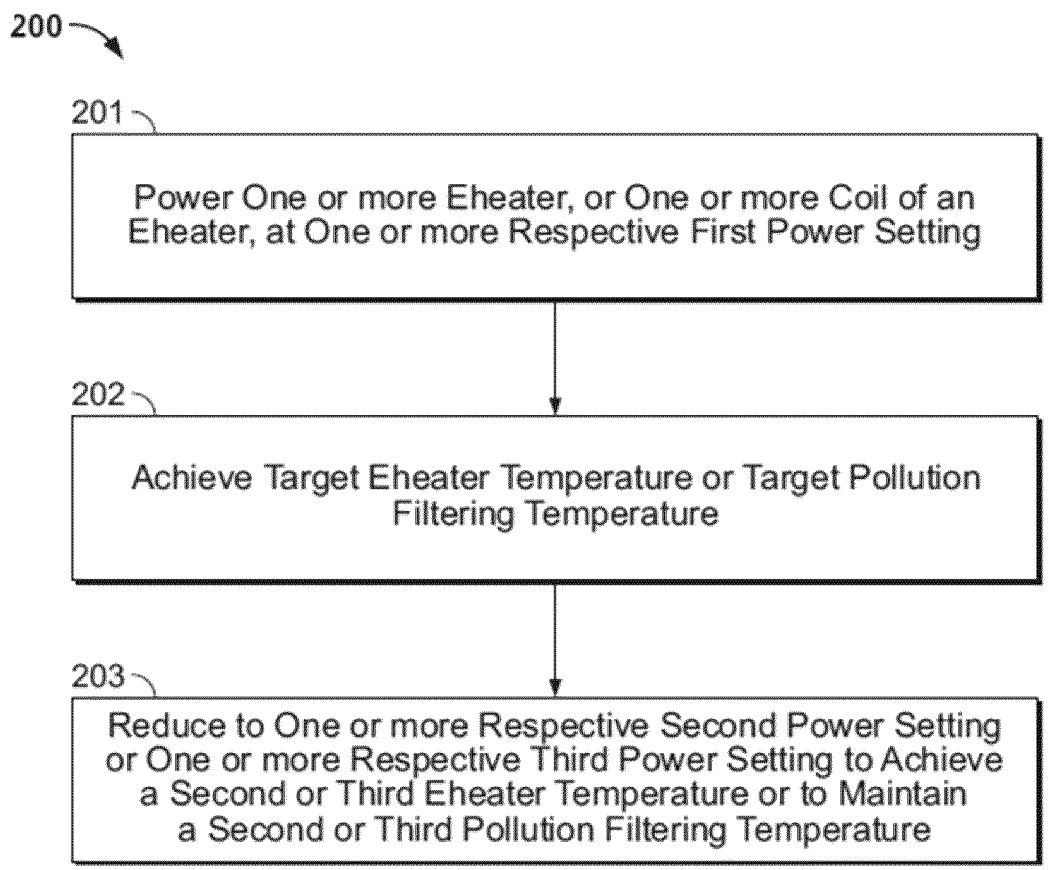
FIG. 2 illustrates an example method of controlling an exhaust heating device in an aftertreatment system.

FIG. 2 illustrates an example method of controlling an exhaust heating device in aftertreatment system. Method 200 illustrates the two-tier strategy, which can be applied to a heater in aftertreatment systems, including the configurations shown in FIGS. 1A-1E. Referring to FIG. 2, the method 200 includes powering (201) one or more e-Heater, or one or more coil of an e-Heater, at one or more respective first power settings; achieving (202) target e-Heater temperature or target pollution filtering temperature; and reducing (203) to one or more respective second power setting or one or more respective third power setting to achieve a second or third e-Heater temperature or to maintain a second or third pollution filtering temperature.

Following this procedure, but in a more nuanced and controlled method, as illustrated in the examples below, SCR temperature can be controlled with more accuracy.

In particular, a method of controlling temperature of an engine aftertreatment system includes: directing an exhaust heating device in the engine aftertreatment system to apply heat using a first temperature setpoint; while applying the heat at the first temperature setpoint, receiving temperature data from a temperature sensor (e.g., sensor 150 of FIG. 1A, sensor 151 or sensor 152 of FIG. 1B, sensor 153 or sensor 154 of FIG. 1C, sensor 155 or sensor 156 of FIG. 1D, sensor 157 or sensor 158 of FIG. 1E) proximate to a SCR device (e.g., SCR 107 of FIG. 1A, LO-SCR 112 or SCR 117 of FIG. 1B, LO-SCR 121 or SCR 126 of FIG. 1C, LO-SCR 131 or SCR 136 of FIG. 1D, LO-SCR 142 or SCR 147 of FIG. 1E) in the engine aftertreatment system; determining from the temperature data that a first temperature is at a first threshold temperature which is less than the first temperature setpoint; and after determining that the first temperature is at the first threshold temperature, directing the exhaust heating device to apply heat using a second temperature setpoint which is less than the first temperature setpoint.

The diesel particulate filter (DPF) (e.g., DPF 105 of FIG. 1A, DPF 115 of FIG. 1B, DPF 124 of FIG. 1C, DPF 135 of FIG. 1D, DPF 146 of FIG. 1E) is a large thermal mass that needs to heat up before a substantial heat flux can be transferred downstream. By incorporating the systems and methods described herein, the DPF can be used to assist in heating the SCR by heating up the DPF first by setting a higher SCR temperature setpoint. Then, the SCR temperature setpoint can be lowered.

For a Heavy-duty engine, an initial setpoint between 30° and 400° C. is desired. This strategy treats the DPF (or DOC+DPF) as a thermal reservoir. The goal is to Heat up the reservoir such that it can heat the SCR downstream.

Figure 3:
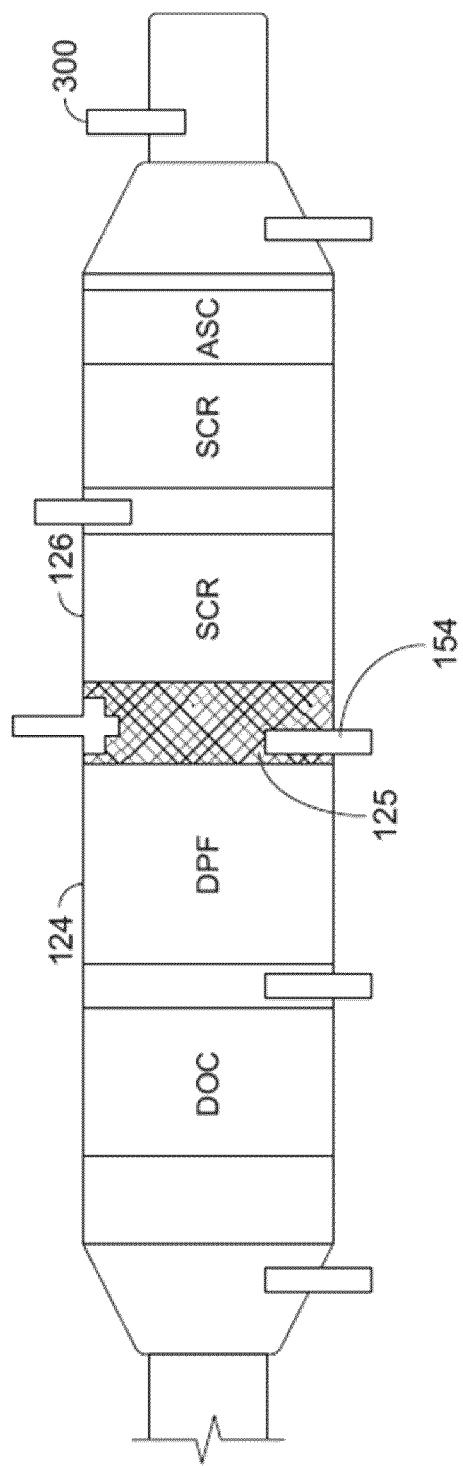
FIG. 3 illustrates an example e-Heater placement in an aftertreatment system for an illustrative scenario in which the described aftertreatment heating strategy is applied.
Figure 4A:
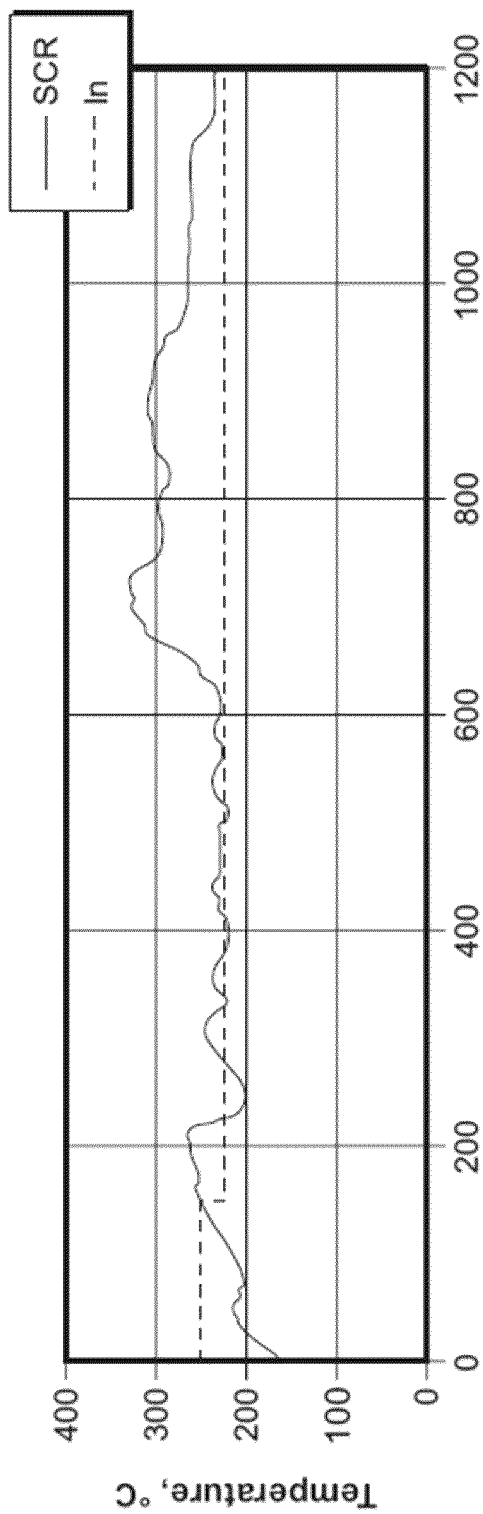
FIG. 4A shows a plot of SCR inlet temperature over time with 250° C. as the AEH followed by 235° C. as the LEH for the configuration of FIG. 3
Figure 4B:
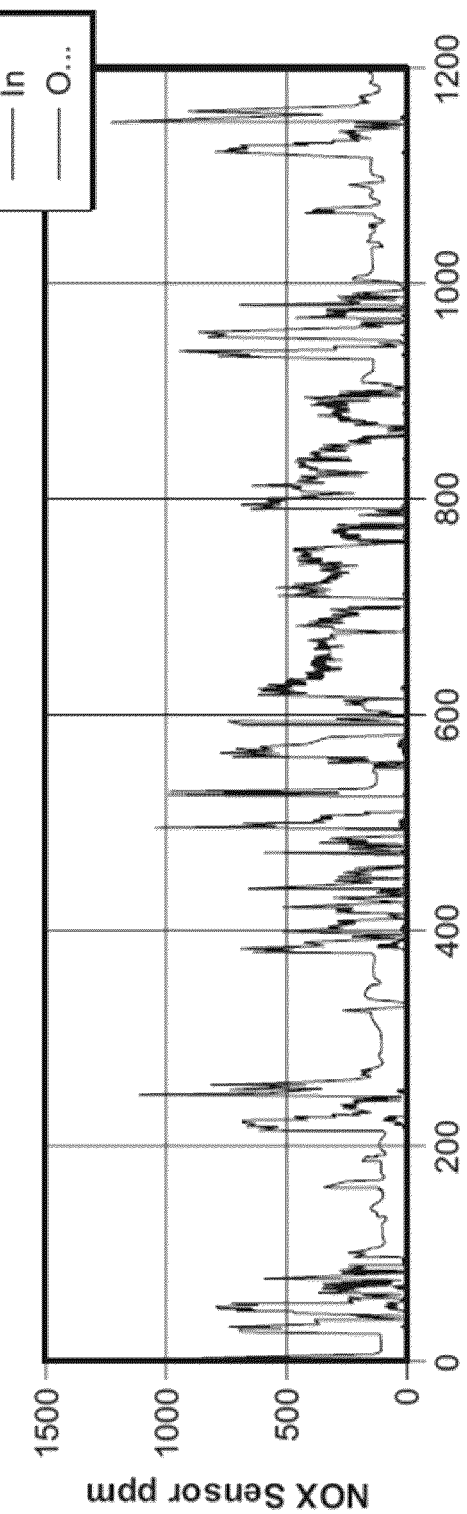
FIG. 4B shows a plot of $NO_x$ at the input and at the output over time with 250° C. as the AEH followed by 235° C. as the LEH for the configuration of FIG. 3.

An illustrative scenario for applying the described aftertreatment heating strategy is provided based on Configuration 3, reflected in FIG. 3. As shown in FIG. 3, which illustrates an example e-Heater placement in an aftertreatment system for an illustrative scenario in which the described aftertreatment heating strategy is applied, the setup can comprise an e-Heater 125 between a DPF 124 and SCR 126. A temperature sensor 154 is proximate the SCR 126. A $NO_x$ sensor 300 is shown at the outlet of the aftertreatment system. An SCR temperature setpoint can be selected to control the e-Heater. Strategies can comprise:

Aggressive e-Heater Heat-Up (AEH): Set SCR Inlet Setpoint to 300° C.
  Exit this mode when the SCR Inlet Temperature Exceeds 275° C.
Moderate Heat-Up (MEH): Set SCR Inlet Setpoint to 250° C.
  Enter this mode when exiting AEH
  Exit this mode when SCR Inlet Temperature Exceeds 240° C.
Low Heat-Up (LEH): Set SCR Inlet Setpoint to 200° C.
  Enter this mode when exiting MBH Other heat-up strategies can be used. For example, the two-tier strategy can comprise 250° C. as the AEH followed by 235° C. as the LEH. FIG. 4A shows a plot of SCR inlet temperature over time with 250° C. as the AEH followed by 235° C. as the LEH for the configuration of FIG. 3 and FIG. 4B shows a plot of $NO_x$ at the input and at the output over time with 250° C. as the AEH followed by 235° C. as the LEH for the configuration of FIG. 3. The sensor position of the input $NO_x$ is not shown in FIG. 3.

It follows that a strategy of heating up the SCR downstream of a DPF can be achieved by setting a higher SCR temperature setpoint. For a Heavy-duty engine, an initial setpoint between 20° and 275° C. is desired. Recognizing that the upstream DPF acts as a thermal reservoir that could cool down the downstream SCR an electric heating e-Heater can be placed upstream of the SCR. This can apply to cold operation and even hot operation (when the SCR is too cold).

A two-tier strategy can accomplish a "Get Hot" for the upper tier (AEH) and "Stay Hot" for the lower tier (LEH). Intermediate tiers can be used (i.e., MEH).

Recognizing that SCR conversion is a function of temperature (generally the higher the better while staying below 450° C.) the temperature must be managed with a strategy since ammonia storage on the SCR can decrease as SCR temperature increases.

The AEH, MEH, & LEH can apply to Cold operation (start up) and even Hot operation (when the SCR is too cold). This means that the system and strategy can be implemented during start-up or during regular operation.

One advantage of this high burner heat flux is that it can shorten the time that the engine spends in its "thermal management" mode. This mode expends higher fuel than "fuel economy" mode. So, it is desired to switch back to fuel economy mode at the soonest.

In the case that the engine+exhaust heating device heats up the aftertreatment system to its sweet spot temperature range fast enough, there may be a net fuel ($CO_2$) savings as the amount of time spent in "fuel economy" mode shifts to an overall fuel savings over the route (or test cycle). So, for the example of a fuel burner as the exhaust heating device burning an increased amount of fuel to heat up the SCR as the target portion of the aftertreatment system, the overage of fuel in the thermal management mode can be offset by the quick return to fuel economy mode. Otherwise, the fuel burner is used in the fuel economy mode to heat the SCR, resulting in two fuel uses in the same time period.

Using the techniques herein, the optimal SCR temperature is achieved, and the fuel burner can be turned off or set to a lower SCR temperature setpoint during the fuel economy mode. In the case of an e-Heater, there is no fuel use in a fuel burner, but fuel can be used for combustion. Considering the below elevated idle example, which uses more fuel than regular idle, the thermal management mode uses more fuel with the e-Heater to heat up. Therefore, the switch back to fuel economy mode can still result in fuel savings over the route if the SCR is heated faster with the strategies herein than without the exhaust heating device.

Therefore, once the thermal reservoir is heated up using the initial setpoint, the exhaust heating device will switch to a lower SCR temperature setpoint. For the example Heavy-duty engine, this setpoint can be between 19° and 200° C.

In various implementations, the setpoint location can be, for example, the SCR inlet with alternative locations at SCR mid-bed, SCR Avg, DPF Out, and DOC out. Sensors can be installed at the SCR inlet, mid-bed, or inlet & outlet, for example. In some cases, sensors can be located at the DPF outlet or DOC outlet. In some cases, other locations for temperature sensors can be used, with algorithms to calculate the expected temperatures at those locations.

As one strategy, once this new setpoint is achieved, the exhaust heating device can immediately shutoff. In some cases, yet another setpoint can be set for the exhaust heating device.

As mentioned above, the DPF is a thermal reservoir. At the point of the second setpoint being reached, the heat in the DPF is such that the exhaust flow through the DPF will keep the downstream SCR hot and in its desired temperature window.

This strategy of switching from a thermal management mode to a fuel economy mode can be expected to handle all drive cycles after cold start. The strategy can be characterized as having a first tier setpoint for the exhaust heating device and a second tier setpoint for the exhaust heating device to result in a 2-tier aftertreatment heat up strategy.

While it can be possible to set a static operational setpoint for the exhaust heating device, a third-tier control setpoint can be used for selective operational modes. Accordingly, it is also possible to implement a 3-tier aftertreatment heat up strategy where the third tier setpoint is between the high setpoint (e.g., 300-400° C.) and the lower setpoint (e.g., 190-200° C.). This setpoint could be used to ensure that the DPF thermal reservoir stays fully heated for specific engine operating conditions such as 1) engine coasting and 2) extended idle operation. These two modes could deplete the thermal potential of the DPF, since they do not themselves generate high heat. By using the third tier, once the engine shifts to power generation mode again, the SCR will be hot from the third-tier exhaust heating device control strategy. The engine coasting and extended idle operation won't cool down the SCR. Lower than desired $NO_x$ reduction can be avoided. An anticipated setpoint for this middle control level is around 250° C. which could be triggered by extended coast and/or extended idle operation As an additional aftertreatment heat up strategy, the above 2 or 3 tiers could be coupled with "elevated idle." Elevated idle during cold operation increases the "heat flux" to the SCR since more fuel is consumed by the engine coupled with the increased exhaust flow. Elevated Idle increases the RPMs of the engine over a normal idle range (for example, elevating from 600 RPMs regular idle to 800 RPMs "elevated idle"). The elevated idle can be used during Tier 1 or Tier 2 with the exhaust heating device activated. Once the SCR is heated up, elevated idle can be exited. If the diesel engine is still idling, it can return to regular idle. This strategy is beneficial because the increased RPMs of elevated idle could potentially cool the SCR by blowing cold air to the SCR, thus prolonging the need to fuel/power the exhaust heating device. Returning to regular idle decreases air flow from the 800 RPMs engine. Optionally, the second tier can be implemented at regular idle with the third tier implement at elevated idle.

As yet another alternative, it is possible to implement elevated idle with the engine in cylinder deactivation (CDA) mode during idle. This will increase the engine heat while keeping the fuel consumption lower than "non-CDA" mode.

As one strategy, a distinct setpoint of 400° C. was chosen, but once the SCR hit 300° C., the setpoint was switched to 200° C.

Tests were conducted in accordance with Federal Test Procedures (FTPs), which are provided by the United States Environmental Protection Agency.

Figure 5A:
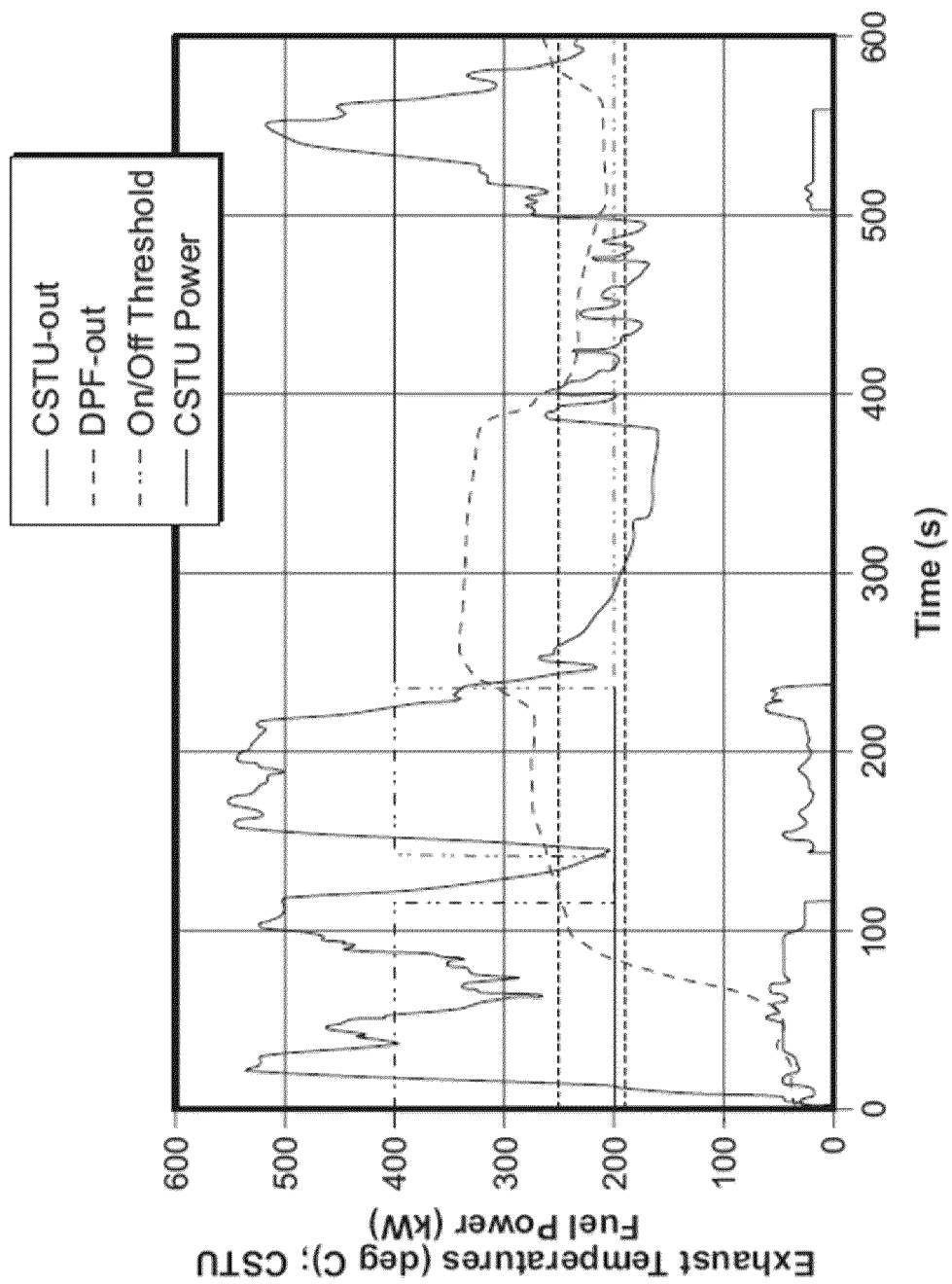
FIGS. 5A-5C show plots from test runs for a COLD FTP cycle.
Figure 5B:
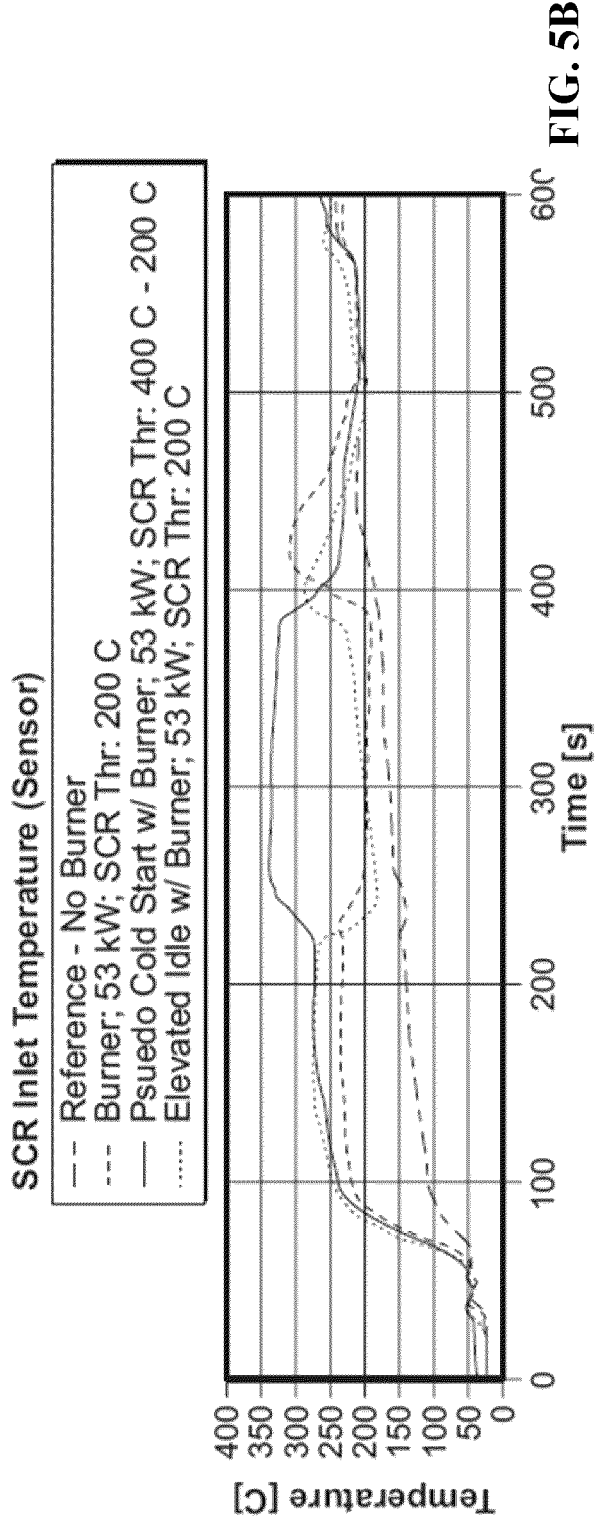
Figure 5C:
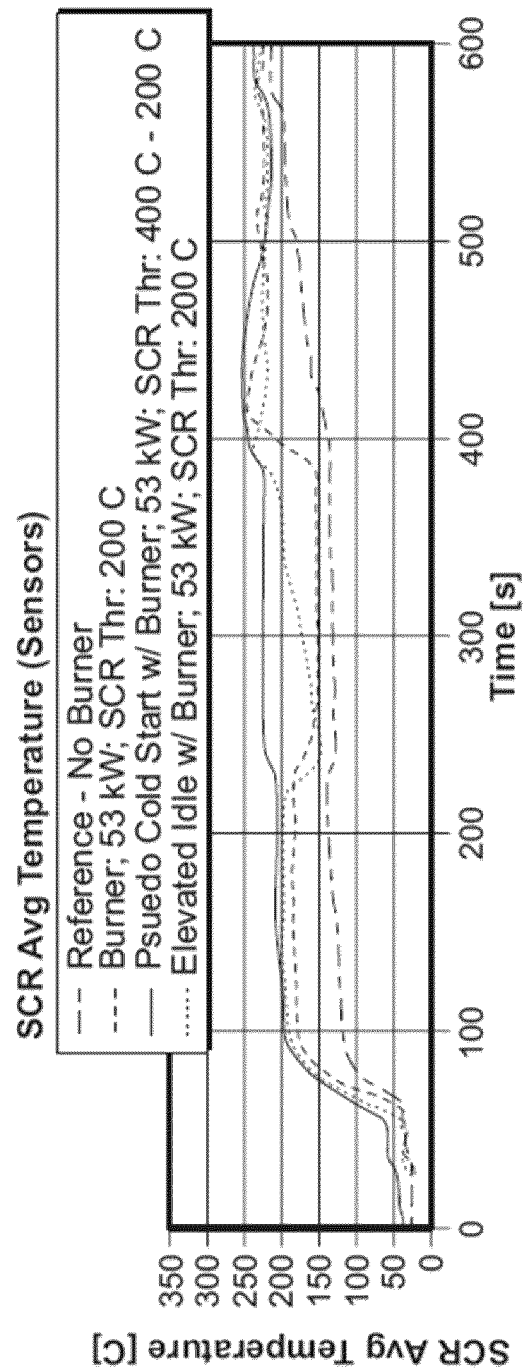

Plots from test runs for a COLD FTP cycle are shown in FIGS. 5A-5C. FIG. 5A shows plots illustrating effect on exhaust temperature vs. time with application of a two-tier strategy in accordance with the subject disclosure, FIG. 5B shows plots of SCR inlet temperature vs. time comparing different approaches, and FIG. 5C shows plots of SCR average temperature over time comparing different approaches.

Referring to FIG. 5A, it can be seen that heat is applied in the engine aftertreatment system using a first temperature setpoint of 400° C. starting at 0 s. Temperature data is shown from a temperature sensor at DPF out/SCR inlet. While applying the heat at the first temperature setpoint, the temperature of the DPF out/SCR inlet increases. When it is detected that the temperature of the DPF out/SCR inlet reaches the threshold temperature switch point of 300° C., a second temperature setpoint of the exhaust heating device is dropped to 200° C. Also shown in the figure is a cold start thermal unit (CSTU) output and CSTU power. CSTU, which is used in the test set up, is a cold start thermal unit air source from Tenneco.

As can be seen in FIGS. 5B and 5C, the two-tier strategy enables higher temperatures during the idle portion of the cycle (250 s to 380 s). Elevated idle is observed in FIG. 5C to have an increasing SCR average temperature trend during the idle portion.

Figure 6A:
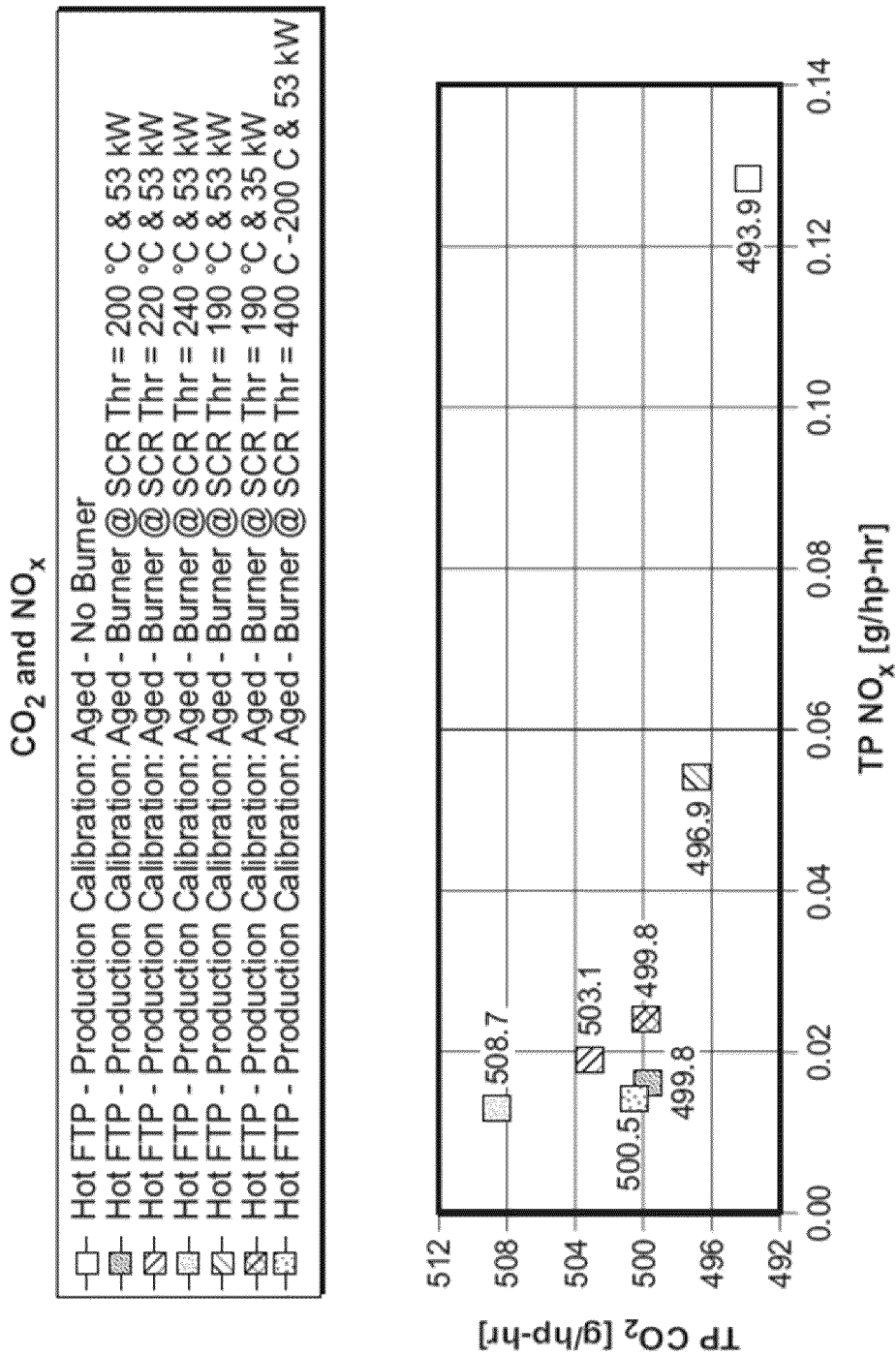
Figure 6B:
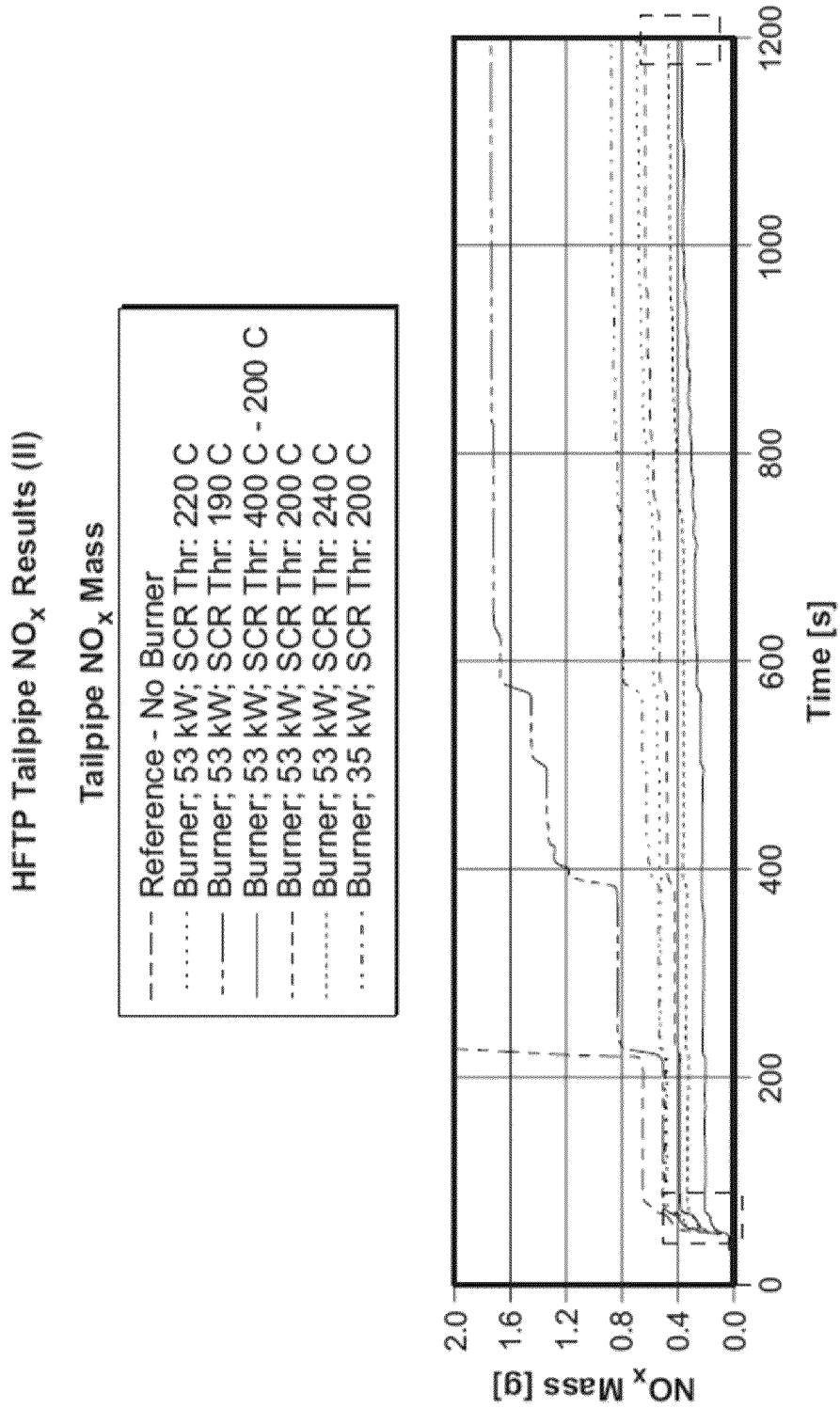

Plots from test runs for a HOT FTP cycle are shown in FIGS. 6A-6C. FIG. 6A shows a comparison plot of tailpipe (TP) $CO_2$ vs. TP $NO_x$ of different configurations. FIG. 6B shows a plot of tailpipe $NO_x$ mass vs. time for different configurations. FIG. 6C illustrates a table showing tailpipe $CO_2$ contribution differences. As can be seen in FIG. 6A, which shows single set-point outcomes versus a 2-tier outcome; the two-tier strategy offered the best trade-off on the HOT FTP for lowest cumulative $NO_x$.

When the engine is experiencing sustained low loads, operation of the exhaust heating device with a single or 2-tier control threshold tied to the DPF-out temperature sensor (or any other temperature further downstream in the system) results in a series of large-amplitude thermal waves passing through the system. This behaviour occurs because of the significant time lag between sensing and actuation, or by analogy, it occurs due to the capacity of the thermal reservoir. The amplitude of these thermal waves can be reduced by tying the threshold to the DOC-out temperature sensor; this effectively reduces the reservoir capacity by more than one-half. A prolonged decease in the engine-out exhaust temperature could be used to trigger shifting the threshold from the DPF-out to the DOC-out sensor.

Figure 7A:
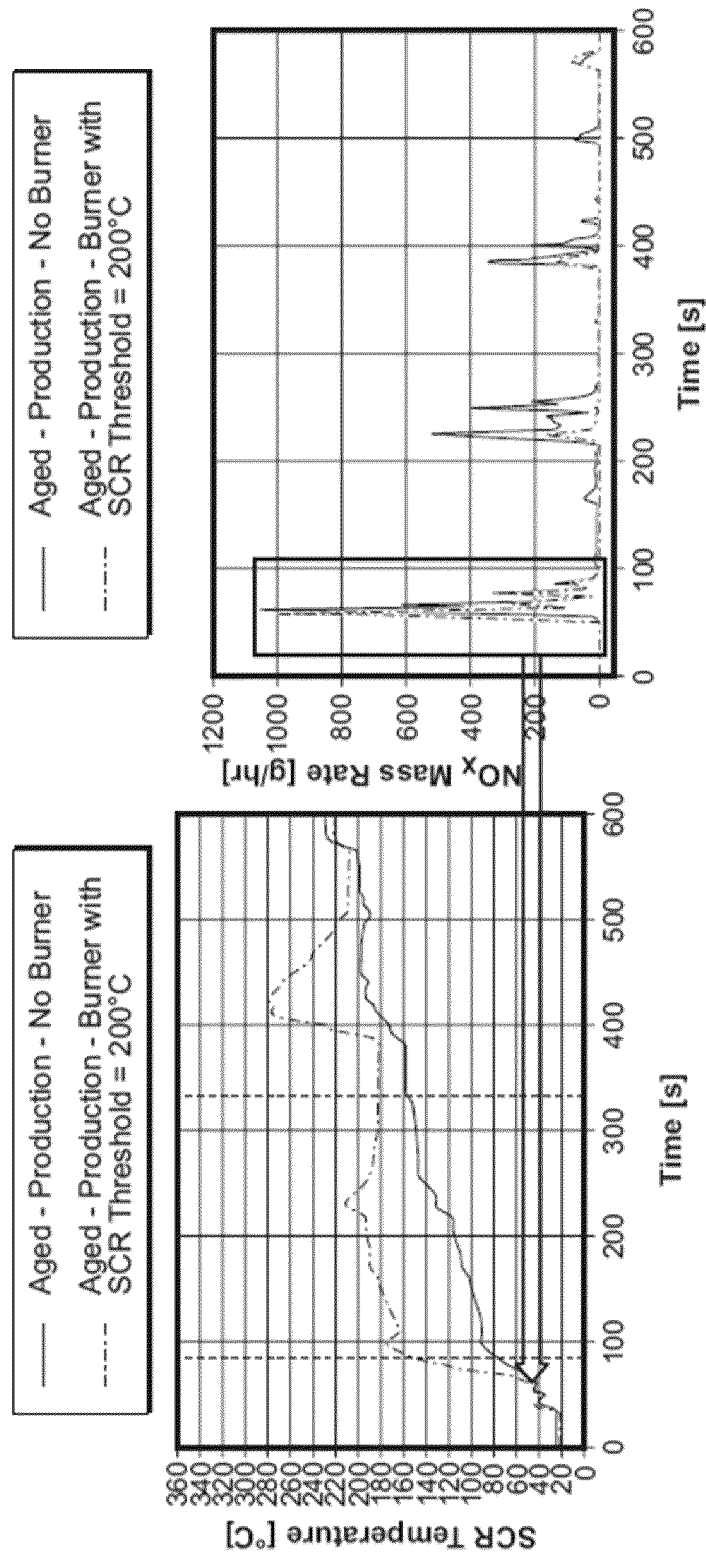
FIGS. 7A and 7B show benefits on COLD FTP.
Figure 7B:
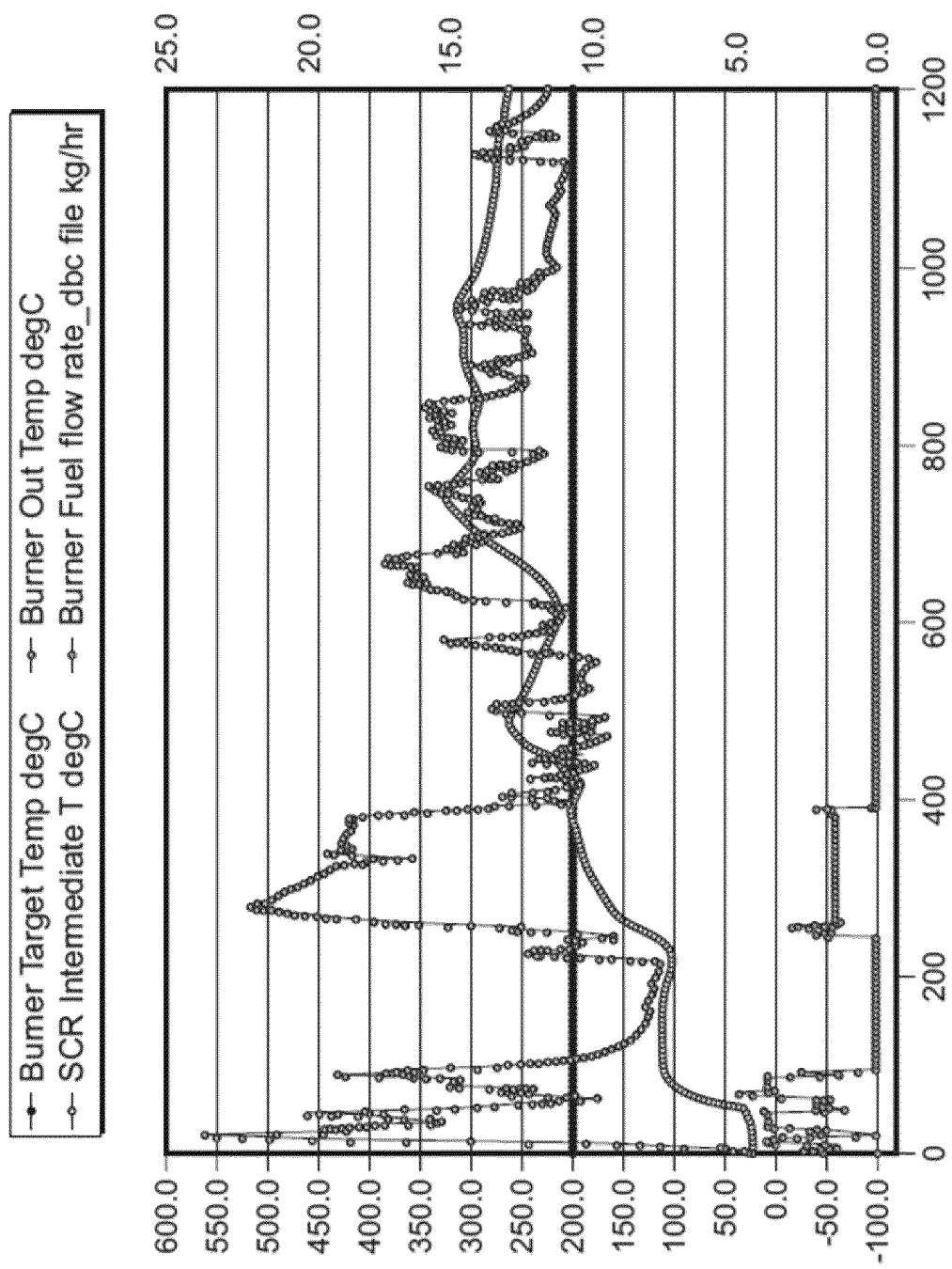

As another articulated control strategy:
- Aggressive Burner Heat-Up (ABH): Set SCR Inlet Setpoint to 400° C.
  - Exit this mode when the SCR Inlet Temperature Exceed 275° C.
- Moderate Burner Heat-Up (MBH): Set SCR Inlet Setpoint to 300° C.
  - Enter this mode when exiting ABH
  - Exit this mode when SCR Inlet Temperature Exceeds 285° C.
- Low Burner Heat-Up (LBH): Set SCR Inlet Setpoint to 200° C.
  - Enter this mode when exiting MBH Additional plots illustrate the benefits on COLD FTP (CFTP). FIGS. 7A and 7B show benefits on COLD FTP. FIG. 7A shows plots of SCR temperature over time and tailpipe $NO_x$ over time for comparing burner operation to no burner operation. FIG. 7B shows a plot of aftertreatment system temperatures (and flow rate) vs. time. As can be seen, the Cold FTP with the fuel burner shows that it takes over 400° C. for the SCR inlet to exceed 240° C. So, to accelerate this heat-up, it is possible to implement 400° C. Setpoint Early to keep burner on at near maximum output. Goal is to exceed 250° C. in less than 60 seconds. Then transition to a lower setpoint=300° C. Then, to a lower level of about 200° C.

Figure 8:
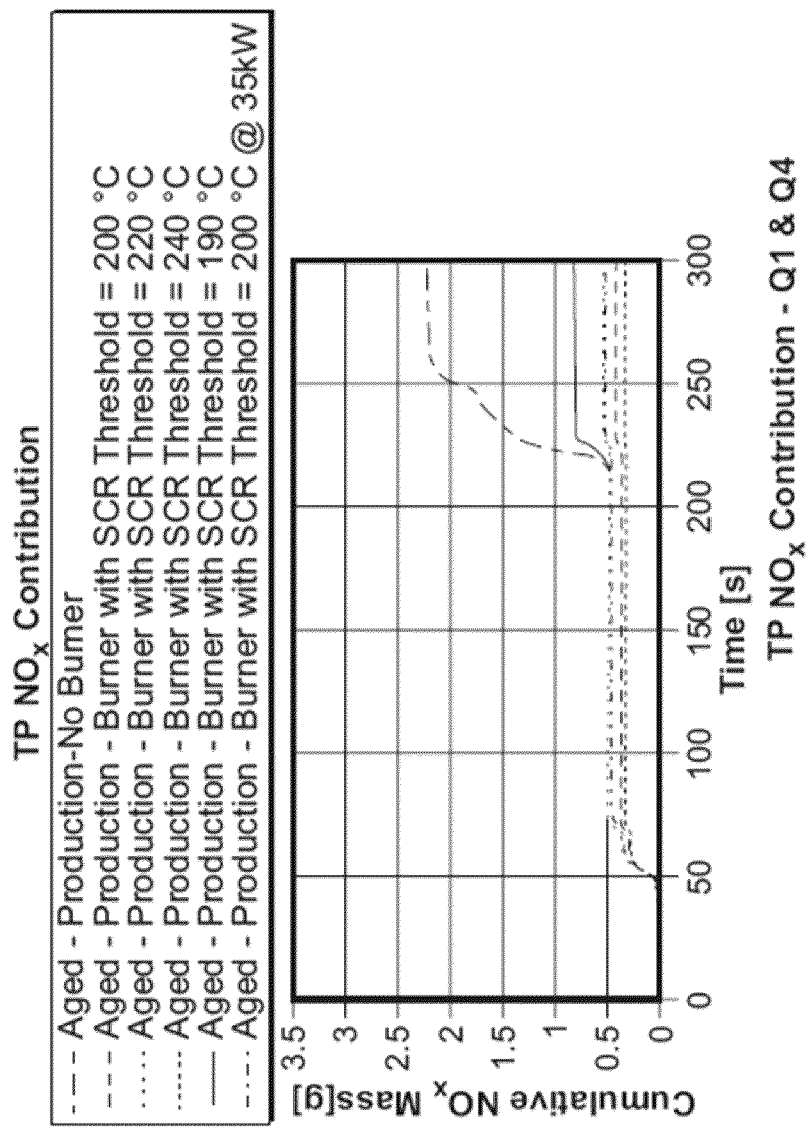
FIG. 8 shows a plot of cumulative $NO_x$ mass vs. time and a table summarizing tailpipe $NO_x$ contribution.

FIG. 8 shows a plot of cumulative $NO_x$ mass vs. time and a table summarizing tailpipe $NO_x$ contribution. The results in FIG. 8 (HOT FTPs) show, with the SCR setpoints of 190 to 240° C., that 48% to 74% of the total tailpipe $NO_x$ occurs in the first quarter of the FTP while less than 5% occurs in the fourth quarter. Since the $1^{st}$ and $4^{th}$ quarter are identical, the difference is a combination of SCR temperature and urea loading on the catalyst. This shows the potential of raising the SCR temperature early.

From the data, it can be seen that both the Cold and Hot FTP cycles benefit from an SCR inlet temperature setpoint of 300° C. (Tier 1). It can be possible to heat a Cold SCR to 240° C. after 400 seconds. In some cases, it can be possible to heat a Hot SCR to 240° C. in around 250 seconds. However, the DPF, as a heat sink, can only supply heat to the SCR for so long. Therefore, when the SCR drops below 240° C. around 400 seconds into the FTP cycle, it is possible to implement Tier 2 of the strategy. From this, it can be understood that it is possible to cease fuel or power to the exhaust heating device between Tiers 1 & 2. So, the transition from Tier 1 to Tier 2 can be instantaneous or it can comprise an un-powered lag. Such is also true for the transition from Tier 2 to Tier 3.

MULTI-TIER Control Strategy

As an additional system & strategy, a multi-tier heater control strategy can be based on upstream catalyst temperature and downstream SCR temperature using an e-Heater in between. That is, the above 2-tier strategy can be expanded to a multi-tier strategy. The multi-tier control strategy based on upstream catalyst temperatures provides similar $NO_x$ emissions while reducing fuel consumption and $CO_2$ emissions.

Figure 9:
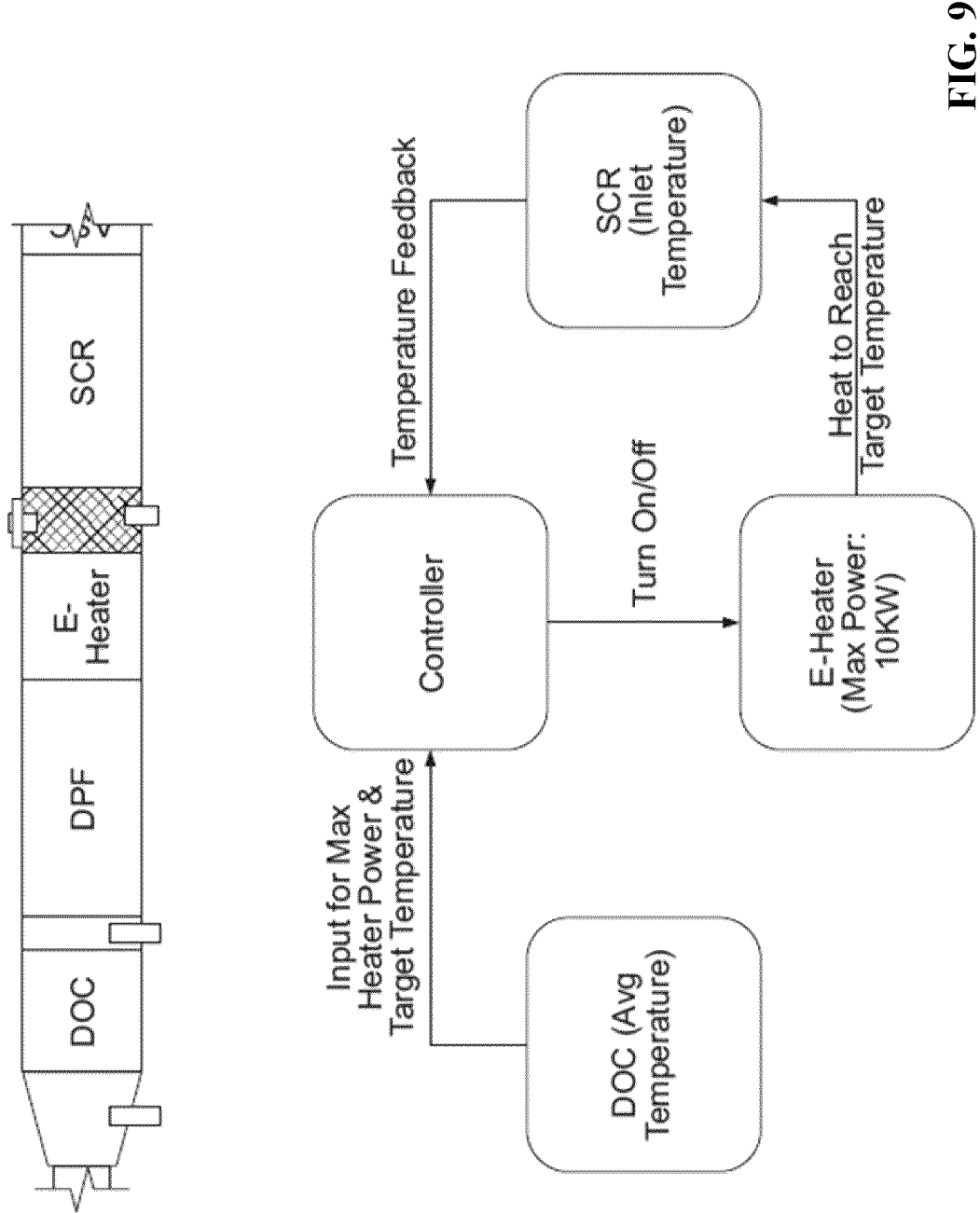
FIG. 9 illustrates an example method flow for a multi-tier heat up strategy with corresponding example aftertreatment system layout.

FIG. 9 illustrates an example method flow for a multi-tier heat up strategy with corresponding example aftertreatment system layout.

Part 1: Senses upstream DOC condition, which is upstream of the e-Heater, to predict any cold wave potential and eliminate it by raising the e-Heater power.

Part 2: Uses a control loop, similar to the 2-tier strategy, of the e-Heater upstream of the SCR The combination of adding these together has yielded similar tailpipe $NO_x$ and much lower $CO_2$/fuel consumption.

The Multi-tier Temperature Control strategy can comprise aspects as follows. Electric heating of the exhaust is important to keep SCR temperatures in a functioning range so that $NO_x$ conversion is high. To reduce the impact of power generation on fuel consumption and $CO_2$, strategies can be improved to control the exhaust heating device rather than just a standard PID control. A high-level approach would be running a thermal model of the AT system to determine the proper amount of heat. Thermal models can consume significant computational effort. So, instead, a multi-tier control strategy based on upstream catalyst temperatures is used to provide similar $NO_x$ emissions while reducing fuel consumption and $CO_2$ emissions.

In some cases, the multi-tier strategy includes receiving temperature information of a DOC, wherein the DOC is upstream the e-Heater in an aftertreatment system. The temperature information of the DOC can be used to predict potential future temperature conditions of the DOC (or more broadly, the aftertreatment system). In some cases, the future temperature conditions of the DOC may be a "cold wave" (i.e., undesirably low temperatures of the aftertreatment system). In response to the predicted future temperature conditions, an e-Heater power level can be raised to eliminate a potential cold wave. In some cases, the multi-tier strategy can be used with the two-tier strategy.

Limiting the maximum heater power helps to limit fuel consumption and $CO_2$ generation. Unfortunately, when the power is limited, there may be conditions where the upstream components are cold, and a cold wave of exhaust gas causes the SCR to drop below maximum temperature because the heater cannot compensate due to the maximum power limitations.

Figure 10:
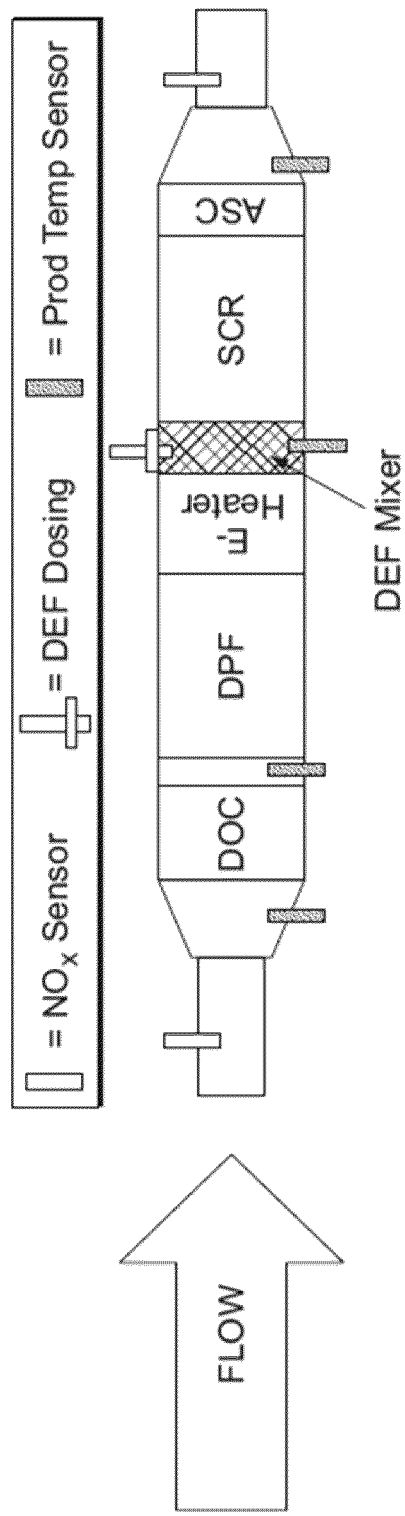
FIG. 10 illustrates flow direction downstream an example aftertreatment system.

FIG. 10 illustrates flow direction downstream an example aftertreatment system.

Maximum heater power and the setpoint control temperature can be based on the average DOC temperature [(in+out)/2]. When the temperatures are colder, a higher heater power is allowed, and a higher target SCR inlet temperature is imposed. As upstream AT temperatures increase, then the heater maximum temperature and the setpoint can be reduced.

The Multi-tier strategy has two parts:

Part 1: Senses upstream DOC condition, which is upstream of the e-Heater, to predict any cold wave potential and eliminate it by raising the e-Heater power.

Part 2: Uses a control loop, implementing techniques similar to the 2-tier strategy, of the e-Heater upstream of the SCR.

The combination of adding these together has yielded similar tailpipe $NO_x$ and much lower $CO_2$/fuel consumption The multi-tier can be adapted to more engine operation modes (because it has more control levers) and to various engines and starting conditions.

The multi-tier, in some instances, can use the 2-tier strategy between the e-Heater and SCR while adding the upstream temperature sensing of the DOC in front of the e-Heater to sense a future state condition such as a cold wave.

The system and strategy can comprise a higher maximum power when catalysts are cold to eliminate the cold wave effect and can transition to less power for normal operation.

This control algorithm can be used instead of a more complicated model-based controller as it has few table entries for calibrating the system.

FIG. 11 illustrates a table of example average aftertreatment system upstream conditions, max heater power, and target temperature.

Figure 12:
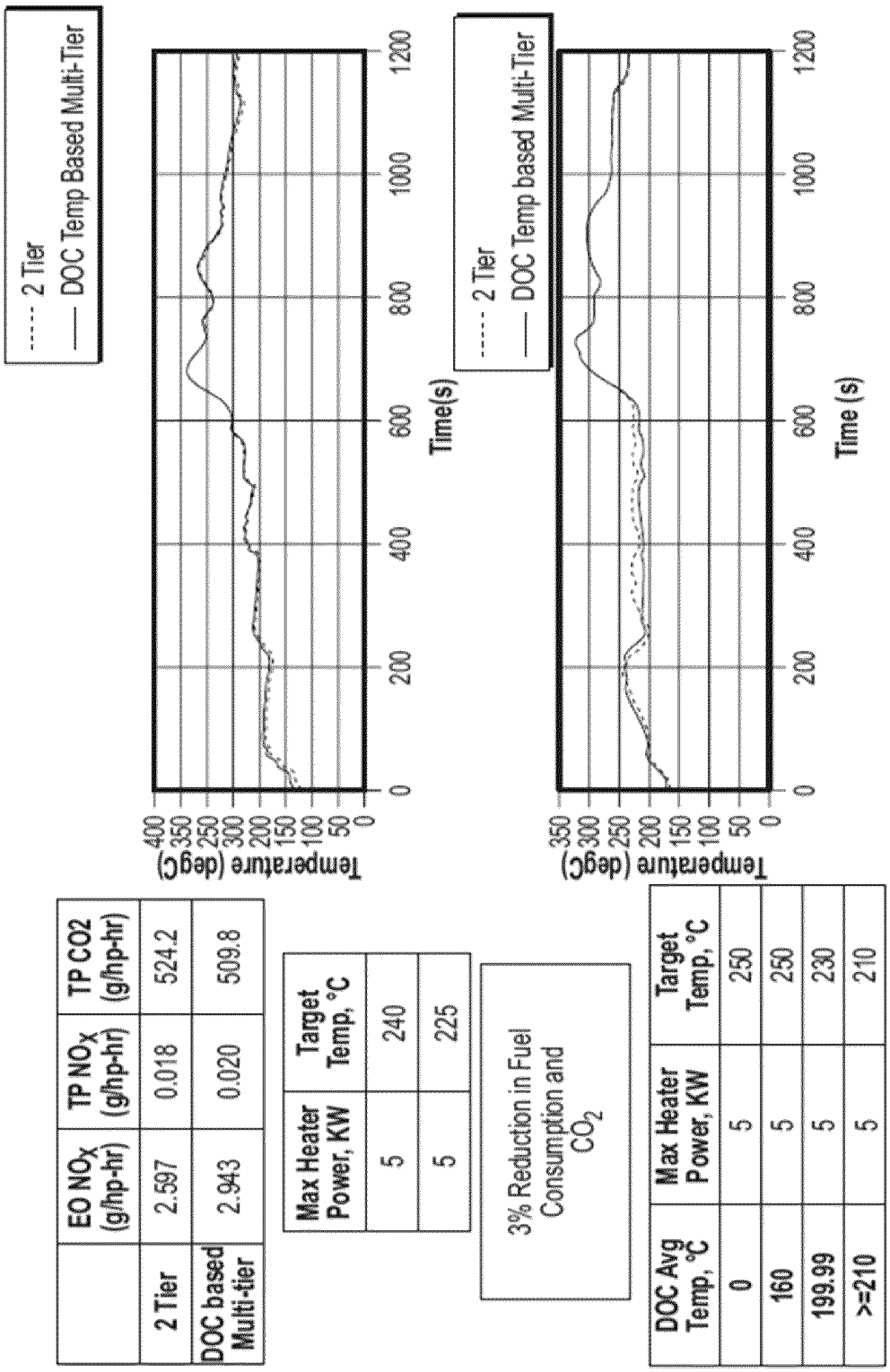
FIG. 12 shows plots and tables comparing a 2-tier aftertreatment heat up strategy against a multi-tier aftertreatment heat up strategy for a FTP cycle.

FIG. 12 shows plots and tables comparing a 2-tier aftertreatment heat up strategy against a multi-tier aftertreatment heat up strategy for a FTP cycle. FIG. 12 illustrates comparisons of the 2-tier strategy against the multi-tier strategy for the FTP cycle.

Figure 13:
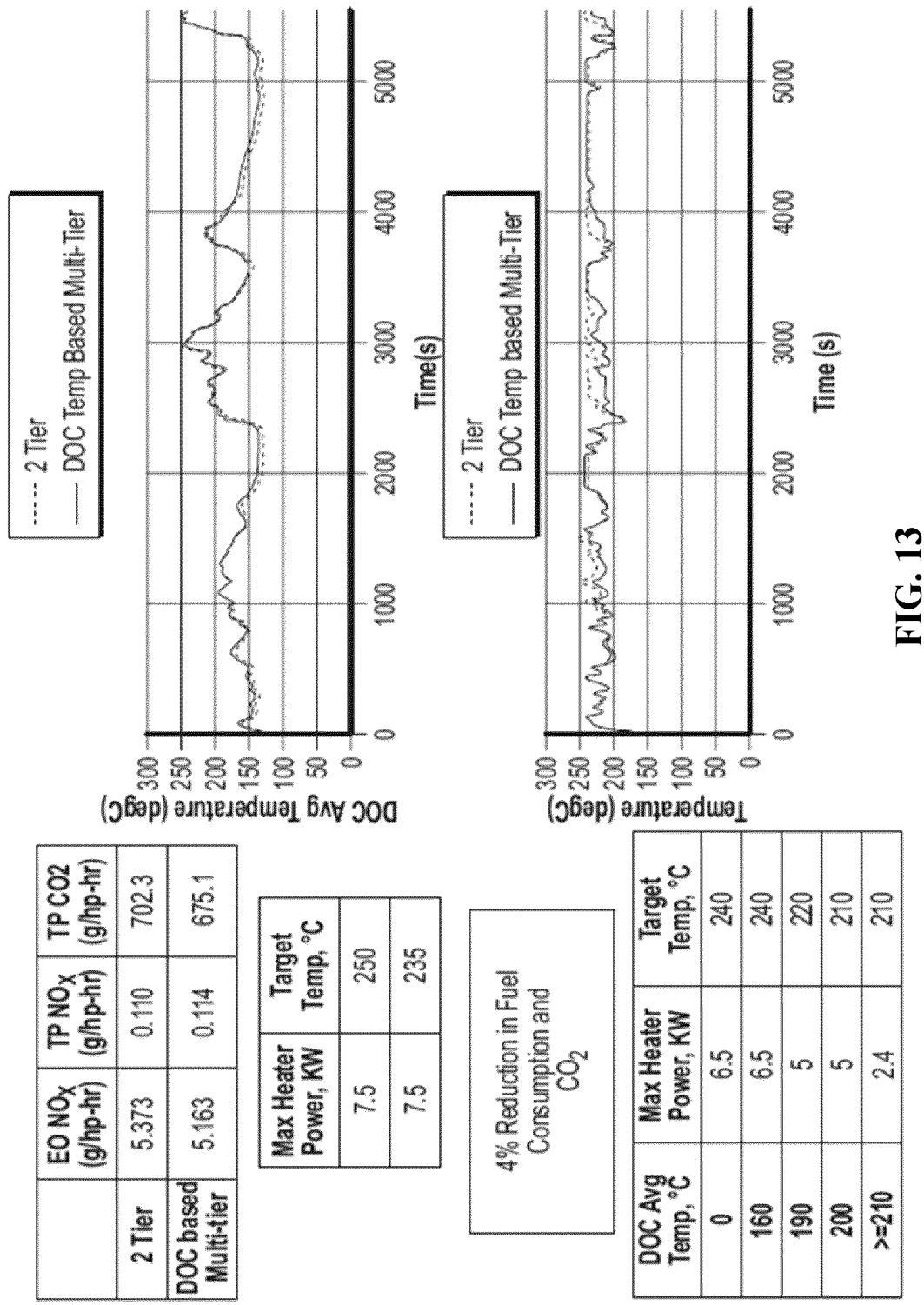
FIG. 13 shows plots and tables comparing a 2-tier aftertreatment heat up strategy against a multi-tier aftertreatment heat up strategy for a low load cycle.

FIG. 13 shows plots and tables comparing a 2-tier aftertreatment heat up strategy against a multi-tier aftertreatment heat up strategy for a low load cycle. FIG. 13 illustrates comparisons of the 2-tier strategy against the multi-tier strategy for a low load cycle.

The multi-tier strategy permits the prediction and or detection of cold waves as they propagate through the exhaust system. Therefore, an upstream or other sensor can receive data that the exhaust or exhaust system component is getting cold. Or, an operation mode selection, such as coasting or low load, causes a prediction of cool off. Then, a setpoint can be chosen to buffer or counteract the cold wave. Then a tier that is not a Tier 1 cold start heat up can be selected. An intermediate setpoint can be selected that is neither the Tier 1 cold start heat up nor the Tier 2 setpoint. It could be a Tier 3 setpoint or another setpoint. Each engine operating mode could have its own setpoint in the multi-Tier strategy, with a transition from fast-heat up and idle temperature maintenance (Tiers 1 & 2) to a non-idle or loaded idle setpoint.

Additional e-Heater heat-up strategies can include using "high-power" mode and/or "low-power" mode. The high-power mode utilizes an e-Heater between 5-10 KW. The low-power mode utilizes an e-Heater between 2.4-5 KW. In some cases, when the e-Heater is placed upstream a LO-SCR device (e.g., LO-SCR 103 of FIG. 1A, LO-SCR 112 of FIG. 1B, LO-SCR 121 of FIG. 1C, LO-SCR 131 of FIG. 1D, or LO-SCR 142 of FIG. 1E) a preferred embodiment sets a maximum e-Heater output at 5 KW. In some cases, 2.4 KW is preferred, allowing 24V operation.

What is claimed is:

1. A method of controlling temperature of an engine aftertreatment system, comprising:
    directing an electric heater in the engine aftertreatment system to apply heat using a first temperature setpoint;
    while applying the heat at the first temperature setpoint, receiving temperature data from a temperature sensor proximate to a selective catalytic reduction (SCR) device in the engine aftertreatment system;
    determining from the temperature data that a first temperature is at a first threshold temperature which is less than the first temperature setpoint; and
    after determining that the first temperature is at the first threshold temperature, directing the electric heater to apply heat using a second temperature setpoint which is less than the first temperature setpoint.

2. The method of claim 1, wherein the electric heater is upstream from the SCR device.

3. The method of claim 2, wherein the SCR device is a light off SCR (LO-SCR).

4. The method of claim 3, wherein the temperature sensor is located at an SCR mid-bed.

5. The method of claim 2, wherein the SCR device is a primary SCR.

6. The method of claim 1, wherein the first temperature setpoint is within a range of 300-400° C. and the second temperature setpoint is within a range of 190-200° C.

7. The method of claim 1, wherein the first threshold temperature is 300° C.

8. The method of claim 1, wherein the first temperature setpoint is within a range of 200-275° C. and the second temperature setpoint is within a range of 190-200° C.

9. The method of claim 1, wherein the heat applied at the first temperature setpoint is applied using the temperature data from a SCR inlet temperature, a SCR mid-bed temperature, SCR average temperature, a diesel particulate filter (DPF) outlet temperature, or a diesel oxidation catalyst (DOC) outlet temperature.

10. The method of claim 1, wherein the temperature sensor is located at a SCR inlet, SCR mid-bed, a DPF outlet, or a DOC outlet.

11. The method of claim 1, further comprising:
    while applying the heat at the second temperature setpoint, receiving second temperature data from the temperature sensor proximate to the SCR device in the engine aftertreatment system; and
    determining from the second temperature data that a second temperature is at a second threshold temperature which is less than the second temperature setpoint.

12. The method of claim 11, further comprising after determining that the second temperature is at the second threshold temperature, directing the electric heater to turn off.

13. The method of claim 11, further comprising after determining that the second temperature is at the second threshold temperature, directing the electric heater to apply heat using a third temperature setpoint which is less than the second temperature setpoint.

14. The method of claim 11, wherein the first threshold temperature is 275° C. and the second threshold temperature is 285° C.

15. The method of claim 11, wherein the first threshold temperature is 275° C. and the second threshold temperature is 240° C.

16. The method of claim 1, further comprising running an engine coupled to the engine aftertreatment system in "elevated idle" mode.

17. The method of claim 16, further comprising running the engine in cylinder deactivation (CDA) mode.

18. The method of claim 1, further comprising directing the electric heater to turn off.

* * * * *